(12) United States Patent
Satomi

(10) Patent No.: US 6,929,375 B2
(45) Date of Patent: Aug. 16, 2005

(54) ILLUMINATION APPARATUS

(75) Inventor: Takeshi Satomi, Konosu (JP)

(73) Assignee: Kabushiki Kaisha Toshiba, Tokyo (JP)

(*) Notice: Subject to any disclaimer, the term of this patent is extended or adjusted under 35 U.S.C. 154(b) by 90 days.

(21) Appl. No.: 10/619,610

(22) Filed: Jul. 16, 2003

(65) Prior Publication Data

US 2004/0021834 A1 Feb. 5, 2004

(30) Foreign Application Priority Data

Aug. 1, 2002 (JP) ........................................ 2002-225253

(51) Int. Cl.[7] ............................ G03B 15/03; F21V 21/00
(52) U.S. Cl. ............................ 362/11; 362/249; 362/252
(58) Field of Search ..................... 355/67, 70; 362/11, 362/12, 227, 235–237, 246, 249, 252

(56) References Cited

U.S. PATENT DOCUMENTS

| | | | | |
|---|---|---|---|---|
| 1,636,141 A | * | 7/1927 | Mammen ..................... | 362/252 |
| 2,609,293 A | * | 9/1952 | Morrison ..................... | 355/70 |
| 3,689,152 A | | 9/1972 | Grimm ......................... | 355/70 |
| 3,754,825 A | | 8/1973 | Sorli et al. ................... | 355/70 |
| 4,893,223 A | * | 1/1990 | Arnold ......................... | 362/252 |
| 5,038,258 A | * | 8/1991 | Koch et al. .................. | 362/237 |
| 5,758,942 A | * | 6/1998 | Fogal et al. .................. | 362/12 |
| 5,822,053 A | * | 10/1998 | Thrailkill .................... | 362/11 |
| 6,040,895 A | * | 3/2000 | Haas ............................ | 355/70 |
| 6,149,283 A | * | 11/2000 | Conway et al. ............. | 362/236 |
| 6,636,292 B2 | * | 10/2003 | Roddy et al. ................ | 355/70 |

FOREIGN PATENT DOCUMENTS

GB      2 097 954 A      11/1982

* cited by examiner

Primary Examiner—Alan Cariaso
(74) Attorney, Agent, or Firm—Finnegan, Henderson, Farabow, Garrett & Dunner, L.L.P.

(57) ABSTRACT

An apparatus according to an embodiment of this invention is an apparatus which comprises a lens for reading the image and a plurality of light sources which are arranged into a circular shape that partially surrounds the lens.

3 Claims, 5 Drawing Sheets

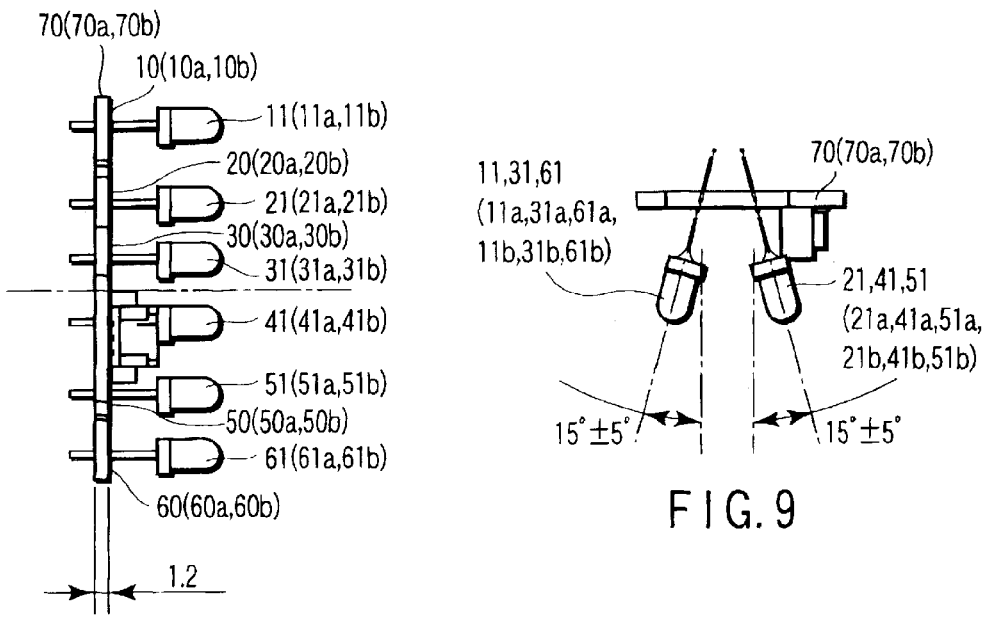
FIG. 8
FIG. 9
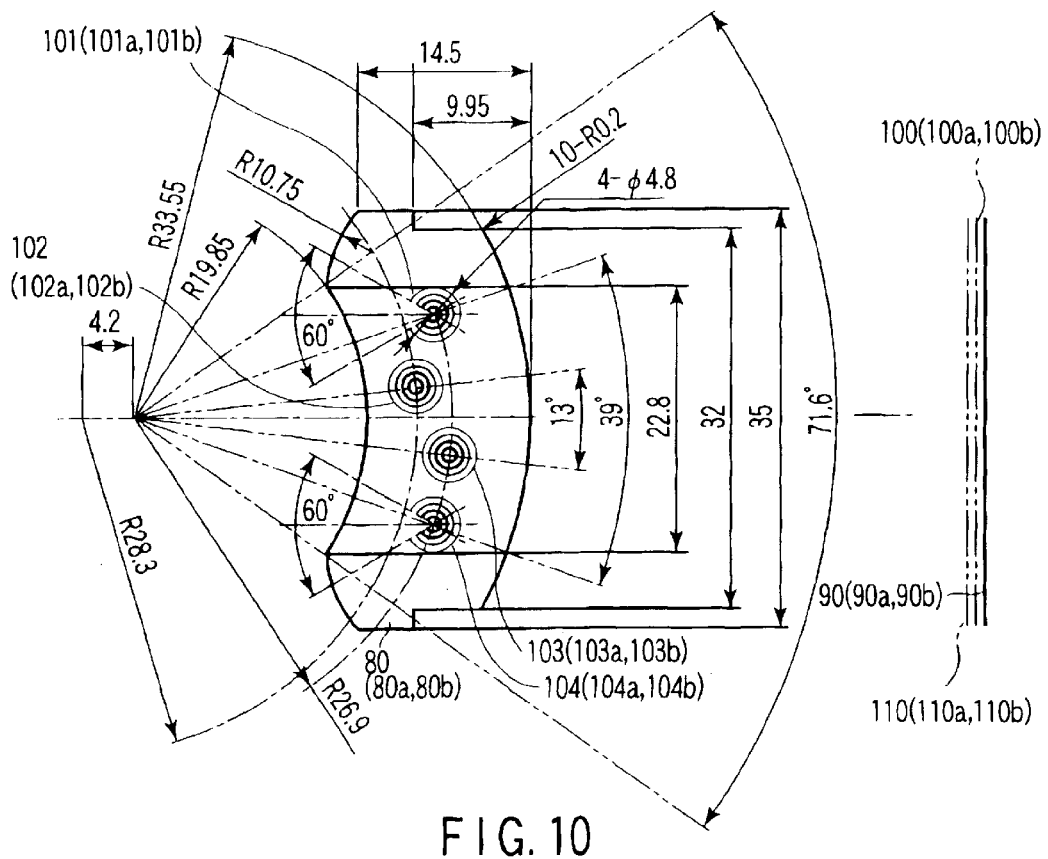
FIG. 10

ILLUMINATION APPARATUS

CROSS-REFERENCE TO RELATED APPLICATIONS

This application is based upon and claims the benefit of priority from the prior Japanese Patent Application No. 2002-225253, filed Aug. 1, 2002, the entire contents of which are incorporated herein by reference.

BACKGROUND OF THE INVENTION

1. Field of the Invention

The present invention relates to an illumination apparatus which is applied to an original reading apparatus which reads an original image to illuminate the original image for original image reading.

2. Description of the Related Art

An original reading apparatus which illuminates an original image, receives reflected light from the original image, detects an image reflected on the reflected light, and reads the original image is known. To properly read an original image, it is important to appropriately illuminate the original image.

To appropriately illuminate an original image, the original image is irradiated from a plurality of directions. However, when a plurality of light sources are to be arranged to illuminate an original from a plurality of directions, support members that support the respective light sources are necessary, resulting in disadvantage for size reduction of the apparatus.

BRIEF SUMMARY OF THE INVENTION

An apparatus according to an aspect of the present invention is an apparatus which comprises a lens for reading the image and a plurality of light sources which are arranged into a circular shape that partially surrounds the lens.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a side view showing the layout of the light sources arranged in the camera illumination sections of the camera heads according to the first and second embodiments;

FIG. 9 is a view showing the positional relationship between the light sources tilted inward and those tilted outward in the camera illumination sections of the camera heads according to the first and second embodiments, and the tilt angles of the light sources; and FIG. 10 is a view showing an example of a diffusion cover that covers light sources.

DETAILED DESCRIPTION OF THE INVENTION

An embodiment of the present invention will be described below with reference to the accompanying drawing.

Figure 1:
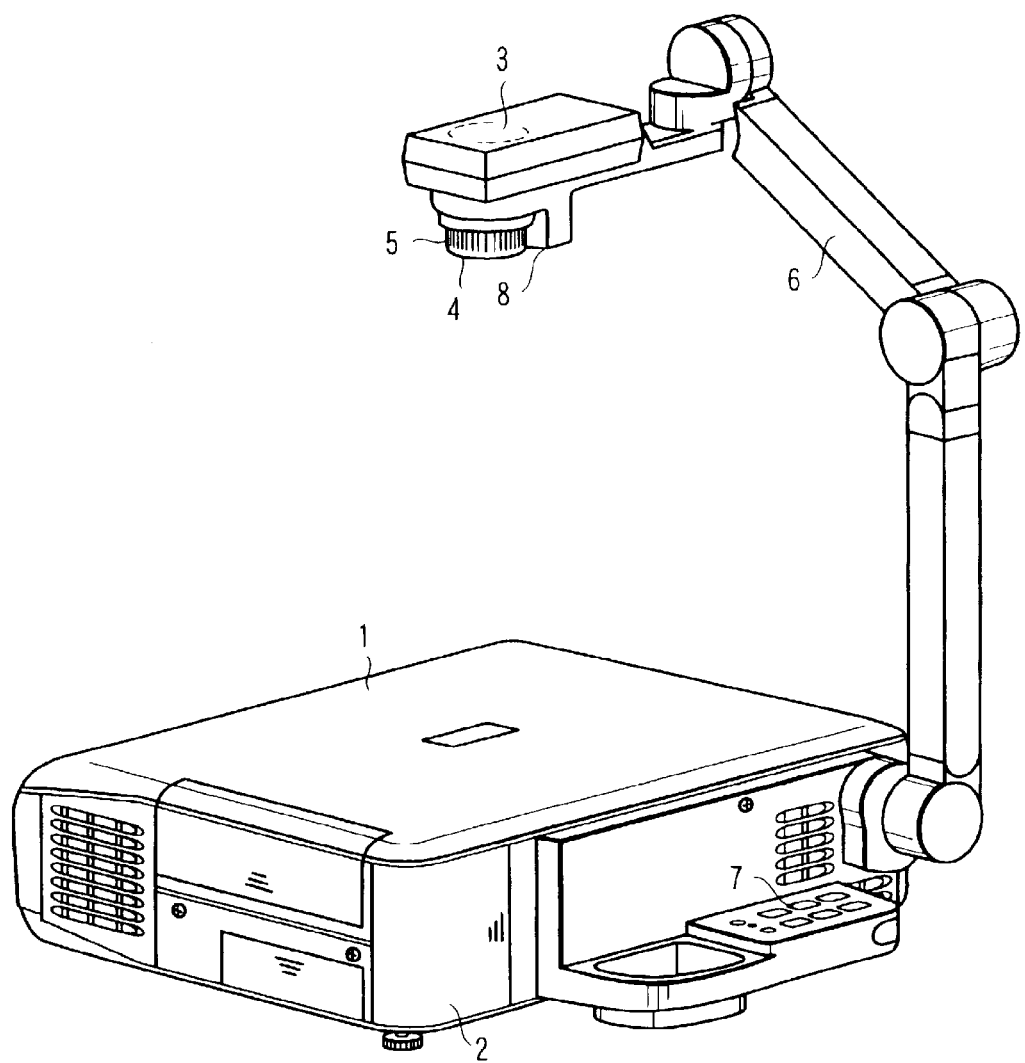
FIG. 1 is a view showing the outer appearance of an original reading apparatus to which an illumination apparatus according to an embodiment of the present invention is applied.

FIG. 1 is a view showing the outer appearance of an original reading apparatus to which an illumination apparatus according to an embodiment of the present invention is applied. As shown in FIG. 1, the original reading apparatus has an original table 1, PC card slot cover 2, camera head 3, camera lens 4, camera focus ring 5, camera arm 6, camera operation section 7, camera illumination section 8 (illumination apparatus), and the like.

An original to be read is placed on the original table 1. The PC card slot cover 2 covers a PC card slot. The original reading apparatus can be connected to a PC or the like using a PC card. The camera head 3 has the camera lens 4, camera focus ring 5, and camera illumination section 8. The camera lens 4 is a lens used to read the original to be read, which is placed on the original table 1. The camera focus ring 5 is the focus adjusting mechanism of the camera. The camera arm 6 is an arm which adjusts the positional relationship between the camera lens 4 and the original to be read, which is placed on the original table 1. The camera operation section 7 receives operation inputs such as various settings related to original reading by the camera head 3. The camera illumination section 8 illuminates the original to read it.

Figure 2:
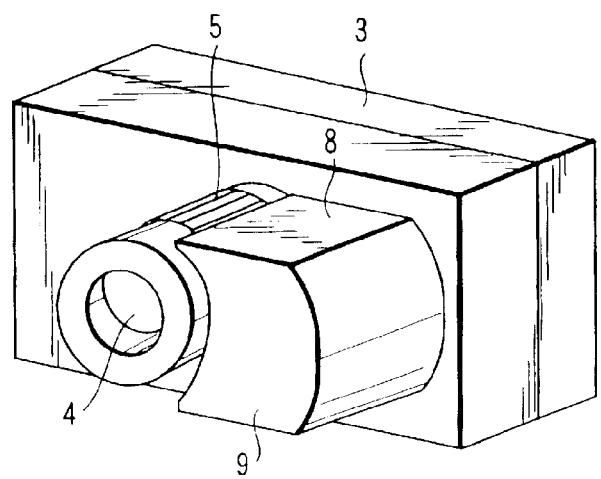
FIG. 2 is a perspective view showing a camera head according to the first embodiment and, more particularly, a camera head viewed from a camera lens side.
Figure 3:
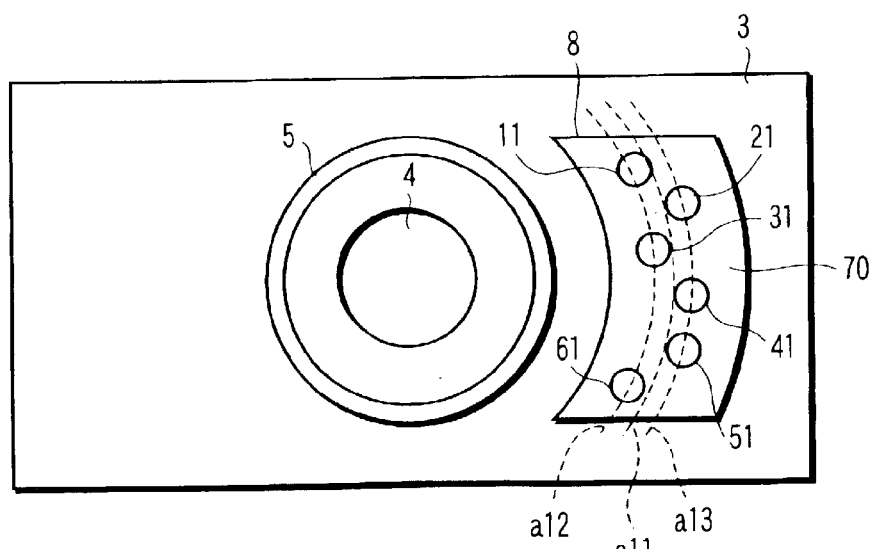
FIG. 3 is a front view showing the camera head according to the first embodiment and, more particularly, the camera head viewed from the camera lens side.

FIG. 2 is a perspective view showing the camera head 3 according to the first embodiment and, more particularly, the camera head 3 viewed from the side of the camera lens 4. FIG. 3 is a front view showing the camera head 3 according to the first embodiment and, more particularly, the camera head 3 viewed from the side of the camera lens 4.

As shown in FIGS. 2 and 3, the camera illumination section 8 is formed into a circular shape that partially surrounds the camera lens 4. The camera illumination section 8 is arranged close to the camera lens 4. The camera illumination section 8 has light sources such as LEDs or discharge tubes. The light sources will be described later in detail. The surface (the surface opposing the original table 1) of the camera illumination section 8 and the surface (the surface corresponding to the original table 1) of the camera lens 4 are almost flush with each other. If the camera illumination section 8 is formed into a ring shape that completely surrounds the camera lens 4, it is very difficult to operate the camera focus ring 5. That is, since the camera illumination section 8 is formed into a circular shape that partially surrounds the camera lens 4, an original can be appropriately illuminated without deteriorating the operability of the camera focus ring 5. In addition, the size, weight, and cost of the camera illumination section 8 can also be reduced. An advantage about increasing the operability of the camera focus ring 5 has been described above. Simultaneously, the operability of the zoom adjusting mechanism and aperture adjusting mechanism, which are arranged around the camera lens 4, can also be increased.

The camera illumination section 8 will now be described in more detail with reference to FIGS. 3 and 6 to 9. FIGS. 6 to 9 also serve as explanatory views of a camera head 3 according to the second embodiment (to be described later). The camera illumination section 8 has a board 70. The board 70 supports light sources such as LEDs that illuminate an original. The board 70 has light source connection portions 10, 20, 30, 40, 50, and 60. A light source (head) 11 is connected to the light source connection portion 10. A light source (head) 21 is connected to the light source connection portion 20. A light source (head) 31 is connected to the light source connection portion 30. A light source (head) 41 is connected to the light source connection portion 40. A light source (head) 51 is connected to the light source connection portion 50. A light source (head) 61 is connected to the light source connection portion 60.

Figure 6:
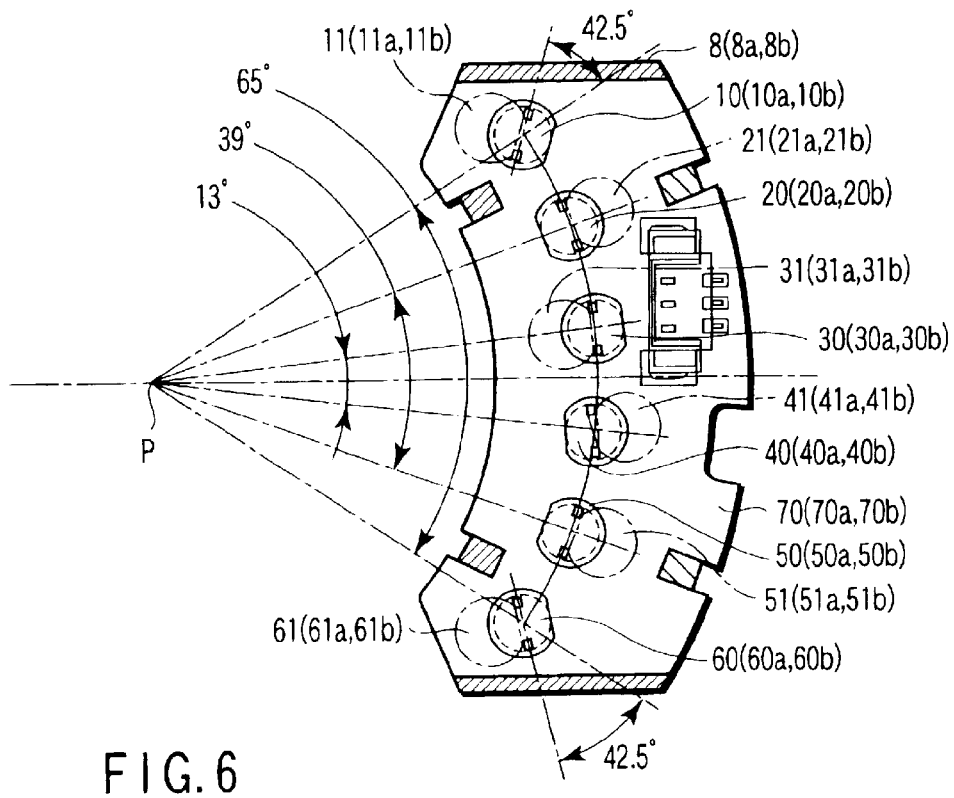
FIG. 6 is a plan view showing the layout of light sources arranged in the camera illumination sections of the camera heads according to the first and second embodiments.
Figure 7:
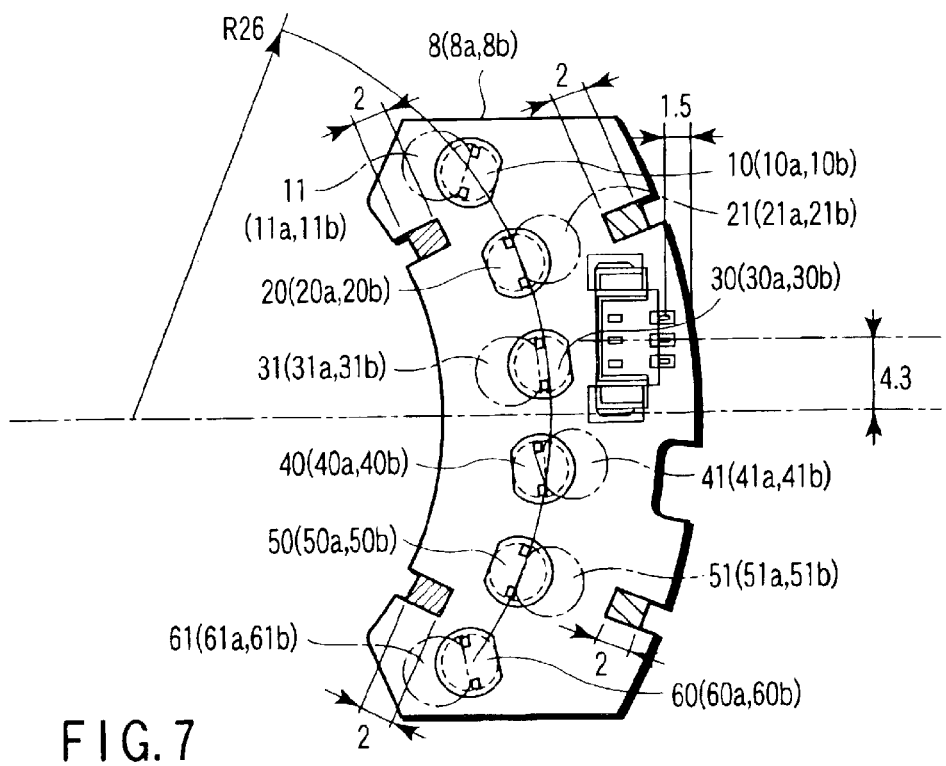
FIG. 7 is a plan view showing the layout of the light sources arranged in the camera illumination sections of the camera heads according to the first and second embodiments, like FIG. 6.

As shown in FIG. 8, the light sources (heads) 11, 21, 31, 41, 51, and 61 are arranged such that they have a uniform height. As shown in FIGS. 3, 6, and 7, the light sources (heads) 11, 21, 31, 41, 51, and 61 are laid out in a staggered pattern. That is, light beams from the light sources (heads) 11, 21, 31, 41, 51, and 61 are radiated in a staggered pattern. When light beams are radiated in a staggered pattern, an original can be uniformly illuminated.

An example of the staggered layout of the light sources will be described below with reference to FIGS. 3, 6, 7, and 9. For the description, circular arcs a11, a12, and a13 are defined, as shown in FIG. 3. The circular arcs a11, a12, and a13 have their centers at the same position. The radius of the circular arc a11 is larger than that of the circular arc a12. The radius of the circular arc a13 is larger than that of the circular arc a11. The light source connection portions 10, 20, 30, 40, 50, and 60 are arranged on the circular arc a11. However, the light sources (heads) 11, 31, and 61 are arranged to be located on the circular arc a12. The light sources (heads) 21, 41, and 51 are arranged to be located on the circular arc a13. In addition, the light sources (heads) 11, 31, and 61 located on the circular arc a12 are located at positions separated from radii drawn from the light sources (heads) 21, 41, and 51 located on the circular arc a13 to a center P of the circular arc. As shown in FIG. 6, the angle made by the center of the circular arc and the centers of the light source connection portions 10 and 60 is, e.g., 65°. The angle made by the center P of the circular arc and the centers of the light source connection portions 20 and 50 is, e.g., 39°. The angle made by the center P of the circular arc and the centers of the light source connection portions 30 and 40 is, e.g., 13°.

That is, as shown in FIG. 9, the light sources (heads) 11, 21, 31, 41, 51, and 61 are supported at predetermined angles with respect to the normal from the board 70. The angles are, e.g., 15°±5°. Strictly speaking, the light sources (heads) 11, 31, and 61 are arranged to tilt toward the inside of the circular arc a11. The light sources (heads) 21, 41, and 51 are arranged to tilt toward the outside of the circular arc a11.

As described above, since the light sources (heads) 11, 21, 31, 41, 51, and 61 are arranged in a staggered pattern, light beams from these light sources (heads) are radiated in a staggered pattern. Accordingly, an original can be uniformly illuminated.

Figure 4:
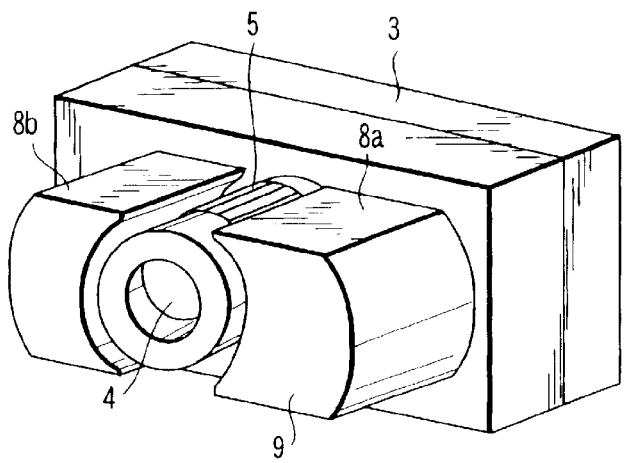
FIG. 4 is a perspective view showing a camera head according to the second embodiment and, more particularly, a camera head viewed from a camera lens side.
Figure 5:
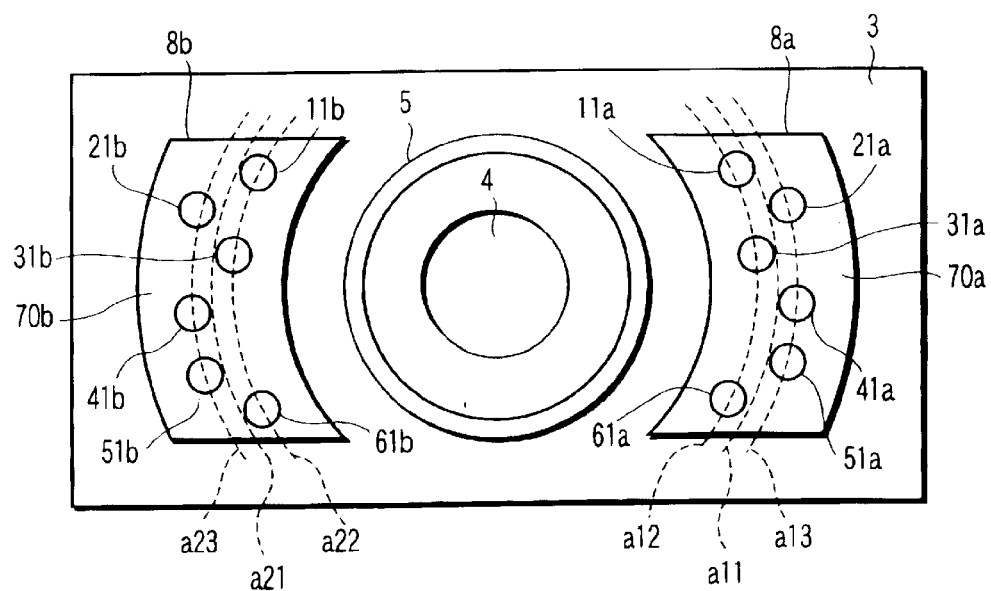
FIG. 5 is a front view showing the camera head according to the second embodiment and, more particularly, the camera head viewed from the camera lens side.

FIG. 4 is a perspective view showing a camera head 3 according to the second embodiment and, more particularly, the camera head 3 viewed from the side of a camera lens 4. FIG. 5 is a front view showing the camera head 3 according to the second embodiment and, more particularly, the camera head 3 viewed from the side of the camera lens 4.

As shown in FIGS. 4 and 5, each of camera illumination sections 8a and 8b is formed into a circular shape that partially surrounds the camera lens 4. Each of the camera illumination sections 8a and 8b has almost the same basic arrangement as that of the camera illumination section 8. Hence, like the camera illumination section 8 of the camera head 3 according to the first embodiment, the camera illumination sections 8a and 8b of the camera head 3 according to the second embodiment can appropriately illuminate an original without deteriorating the operability of a camera focus ring 5. In addition, the size, weight, and cost of the camera illumination sections 8a and 8b can also be reduced. Furthermore, since the camera illumination sections 8a and 8b are formed to sandwich the camera lens 4, the camera head 3 according to the second embodiment can more appropriately illuminate an original, as compared to the camera head 3 according to the first embodiment.

The camera illumination sections 8a and 8b will now be described in more detail with reference to FIGS. 5 and 6 to 9. The camera illumination section 8a has a board 70a. The board 70a supports light sources such as LEDs that illuminate an original. The board 70a has light source connection portions 10a, 20a, 30a, 40a, 50a, and 60a. A light source (head) 11a is connected to the light source connection portion 10a. A light source (head) 21a is connected to the light source connection portion 20a. A light source (head) 31a is connected to the light source connection portion 30a. A light source (head) 41a is connected to the light source connection portion 40a. A light source (head) 51a is connected to the light source connection portion 50a. A light source (head) 61a is connected to the light source connection portion 60a.

The camera illumination section 8b has a board 70b. The board 70b supports light sources such as LEDs that illuminate an original. The board 70b has light source connection portions 10b, 20b, 30b, 40b, 50b, and 60b. A light source (head) 11b is connected to the light source connection portion 10b. A light source (head) 21b is connected to the light source connection portion 20b. A light source (head) 31b is connected to the light source connection portion 30b. A light source (head) 41b is connected to the light source connection portion 40b. A light source (head) 51b is connected to the light source connection portion 50b. A light source (head) 61b is connected to the light source connection portion 60b.

The arrangement of the illumination section 8 of the camera head 3 according to the first embodiment is almost the same as that of the illumination section 8a of the camera head 3 according to the second embodiment. That is, the board 70 corresponds to the board 70a. The light source connection portions 10, 20, 30, 40, 50, and 60 correspond to the light source connection portions 10a, 20a, 30a, 40a, 50a, and 60a, respectively. The light sources (heads) 11, 21, 31, 41, 51, and 61 correspond to the light sources (heads) 11a, 21a, 31a, 41a, 51a, and 61a, respectively. In addition, the illumination section 8a and illumination section 8b are symmetric with respect to a center P of a circular arc a11. That is, the board 70a corresponds to the board 70b. The light source connection portions 10a, 20a, 30a, 40a, 50a, and 60a correspond to the light source connection portions 10b, 20b, 30b, 40b, 50b, and 60b, respectively. The light sources (heads) 11a, 21a, 31a, 41a, 51a, and 61a correspond to the light sources (heads) 11b, 21b, 31b, 41b, 51b, and 61b, respectively.

Hence, like the light sources of the illumination section 8, since the light sources (heads) 11a, 21a, 31a, 41a, 51a, and 61a of the illumination section 8a are arranged in a staggered pattern, light beams from these light sources (heads) are radiated in a staggered pattern. Accordingly, an original can be uniformly illuminated. In addition, like the light sources of the illumination section 8a, since the light sources (heads) 11b, 21b, 31b, 41b, 51b, and 61b of the illumination section 8b are arranged in a staggered pattern, light beams from these light sources (heads) are radiated in a staggered pattern. Accordingly, an original can be uniformly illuminated.

FIG. 10 is a view showing an example of a diffusion cover that covers light sources. The camera illumination section 8 of the camera head 3 according to the first embodiment is covered with a diffusion cover 80. That is, the diffusion cover 80 is designed to cover the light sources (heads) 11, 21, 31, 41, 51, and 61. The diffusion cover 80 has a diffusion sheet 90, diffusion print surface 100, and adhesive surface 110. For example, diffusion portions 101, 102, 103, and 104 are printed on the diffusion print surface 100. Light beams radiated from the light sources (heads) 11, 21, 31, 41, 51, and 61 are diffused by the diffusion cover 80 (diffusion portions 101, 102, 103., and 104) and illuminate an original. With the diffusion cover 80 (diffusion portions 101, 102, 103, and 104), an original can be uniformly illuminated.

Similarly, the camera illumination section 8a of the camera head 3 according to the second embodiment is covered with a diffusion cover 80a. The camera illumination section 8b is covered with a diffusion cover 80b. The basic arrangement of the diffusion covers 80a and 80b is almost the same as that of the diffusion cover 80, and a detailed description thereof will be omitted.

In the above description, the camera illumination sections 8, 8a, and 8b are formed into a circular shape that partially surrounds the camera lens 4. However, the camera illumination section of the present invention is not limited to the circular shape. Also, in the above description, six light sources are arranged. However, in the present invention, the number of light sources is not limited to six.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus comprising:

a lens for reading an image;

a plurality of light sources staggered to a predetermined circular arc that surrounds the lens; and a support board which supports said plurality of light sources, some light sources of said plurality of light sources being supported at predetermined angles with respect to a normal from the support board to be tilted toward an inside of the circular arc, and remaining light sources of said plurality of light sources being supported at predetermined angles with respect to the normal from the support board to be tilted toward an outside of the circular arc.

2. An apparatus comprising:

a lens for reading an image;

a first plurality of light sources located on a first circular arc that surrounds the lens; and a second plurality of light sources located on a second circular arc that has the same center as that of the first circular arc and a radius larger than that of the first circular arc, wherein said first plurality of light sources located on the first circular arc are located at positions separated from radii drawn from said second plurality of light sources located on the second circular arc.

3. An apparatus comprising:

a lens for reading an image:

a first plurality of light sources which are located on a first circular arc that surrounds the lens, a second plurality of light sources which are located on a second circular arc that has the same center as that of the first circular arc and a radius larger than that of the first circular arc, and a support board which supports said first and second plurality of light sources located on the first and second circular arcs, said first plurality of light sources located on the first circular arc being supported at predetermined angles with respect to a normal from the support board to be tilted toward an inside of the circular arc, and said second plurality of light sources located on the second circular arc being supported at predetermined angles with respect to the normal from the support board to be tilted toward an outside of the circular arc.

* * * * *

UNITED STATES PATENT AND TRADEMARK OFFICE
CERTIFICATE OF CORRECTION

PATENT NO. : 6,929,375 B2 Page 1 of 1
DATED : August 16, 2005
INVENTOR(S) : Satomi It is certified that error appears in the above-identified patent and that said Letters Patent is hereby corrected as shown below:

<u>Column 6,</u>
Line 31, change "image:" to -- image; --.

Signed and Sealed this

First Day of November, 2005

JON W. DUDAS
*Director of the United States Patent and Trademark Office*